United States Patent Office 2,925,316
Patented Feb. 16, 1960

2,925,316

WETTING AGENTS FOR AQUEOUS ALKALIZING LIQUIDS

Kurt Hofer, Neue Welt, Munchenstein, Switzerland, assignor, by mesne assignments, to Saul & Co., Newark, N.J., as nominee of Fidelity Union Trust Company, executive trustee under Sandoz Trust No Drawing. Application February 24, 1954
Serial No. 412,387

Claims priority, application Switzerland March 6, 1953

8 Claims. (Cl. 8—127)

The present invention relates to wetting agents for aqueous alkalizing liquids.

These wetting agents are prepared, according to the invention, by the action of alkali metal sulfite on halogen hydrins of monoalkyl ethers of glycerol, the alkyl group containing 5 to 7 carbon atoms, or on the corresponding epoxides, and if desired admixing the reaction mixture or the obtained reaction products with ether alcohols.

The halogen hydrins are advantageously prepared from the corresponding alcohols containing 5 to 7 carbon atoms in the molecule, such for example as isoamyl alcohol, 2-amyl alcohol, n-hexyl alcohol, 2-ethylbutyl alcohol, methyl-amyl alcohol, 3-heptyl alcohol, etc., as well as mixtures of these alcohols, and epichlorhydrin, and the epoxides are prepared from the thus-obtained chlorhydrins by the splitting off of hydrochloric acid, in known manner.

The reaction with the alkali metal sulfite advantageously takes place in known manner in aqueous solution or suspension at ordinary or elevated pressure and at elevated temperature. Neutral sulfites are preferably employed when starting with halogen hydrins. For reaction with the epoxides, the acid sulfites, such as sodium bisulfite or potassium bisulfite, are better suited.

In the reaction with the alkali metal sulfites, there are formed alkali metal salts of the compound

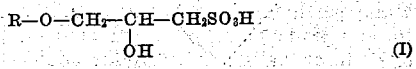

and isomers thereof, wherein R stands for an alkyl group as hereinbefore identified. However, the reaction may also be carried out in such manner that it results only partly in the production of Compounds I, and for the rest in the production of ether alcohols of the formula

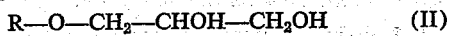

or isomers thereof or condensation products of these ether alcohols with the corresponding halogen hydrins or epoxides. The formation of such secondary products is of particular advantage where the sulfonic acids or the salts thereof have a tendency toward crystallization, the presence of such ether alcohols acting to slow up or entirely to prevent the crystallization. In addition, the wetting action is enhanced by such ether alcohols.

In fact, in some cases it is advantageous to add to the reaction products ether alcohols, such for example as the monoethers of ethylene glycol, propylene glycol and butylene glycol and of polyethylene glycols, such as ethylene glycol-mono-n-butyl ether, diethylene glycol-mono-n-butyl ether, diethylene glycol-mono-isoamyl ether, hexaethylene glycol-mono-dodecyl ether, 1,2-propylene glycol-mono-n-butyl ether, 1,3-butylene glycol-1-methyl ether, etc., and also mono- and di-ethers of glycerol, such for example as glycerol-mono-butyl ether, glycerol-mono-isoamyl ether, glycerol-mono-xylenyl ether, glycerol-di-isobutyl ether, glycerol-di-isoamyl ether, and polyglycerol ethers, such as are obtained by the addition of two and more mols of epichlorhydrin onto one mol of butyl alcohol, amyl alcohol or hexyl alcohol and subsequent boiling with dilute aqueous caustic alkali.

Depending upon the particular use in view for the aforesaid ether-sulfonic acid salts and the mixtures thereof with ether alcohols, suitable further auxiliary agents may be added thereto, such for example as phenols or naphthenic acids which enhance the wetting action, or aliphatic or cycloaliphatic hydrocarbons, such as those with boiling points in the range of 150–250° C., or alcohols such for example as those containing 5 to 12 carbon atoms in the molecule, which enhance the wetting action and also suppress undesired foaming action. Phosphoric acid-trialkyl esters and organic silicon compounds are also suitable to suppress foaming action.

The wetting agents of the present invention are particularly suitable for use in alkaline textile treating baths, such as are employed in the mercerization and alkalization of cellulose and regenerated cellulose, i.e. in aqueous caustic alkali solutions of 20° to 40° Bé. as well as in weaker lyes, which solutions may also contain common salt (sodium chloride) or soda (sodium carbonate).

The following examples set forth presently-preferred illustrative embodiments of the invention. In these examples, the parts and percentages, unless otherwise indicated, are by weight; the temperatures are in degrees centigrade.

EXAMPLE 1

235 parts of epichlorhydrin are added slowly, while stirring, to 220 parts of isoamyl alcohol and 1 part by weight of boron fluoride etherate, and then stirring is continued for several more hours at 85°. When a test specimen of the reaction product is distilled under reduced pressure, it will be found that all the epichlorhydrin has reacted and that only a very small quantity of unchanged isoamyl alcohol is still present. The crude chlorhydrin ether is then treated for 4 hours at 30–40° with 260 parts of aqueous caustic soda solution of 50% strength. After being filtered off from the precipitated sodium chloride, the crude epoxide is easily isolated as a thinly fluid oil. In addition to the primary product of the formula

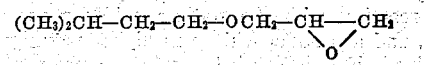

(boiling point at 17 mm. Hg: 85–87°; $D_4^{20} = 0.927$ gram per cubic centimeter), there is also present primarily the compound of the formula

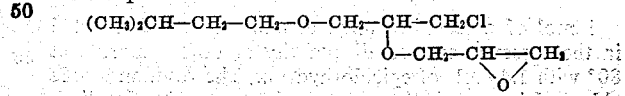

Approximately 365 parts of crude epoxide are obtained.

The crude epoxide is then added slowly and with stirring to 650 parts of an aqueous sodium bisulfite solution of 30% strength at 85°; and stirring is then continued for 6 hours at this temperature. A clear, slightly yellowish solution results. Titration with tenth-normal iodine solution indicates that less than 0.5% of unchanged bisulfite is present. The solution contains about 45% of the sodium salt of isoamyloxypropanolsulfonic acid of the formula

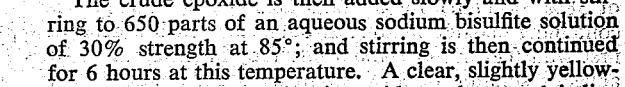

and about 8% of ether-like condensation product of epichlorhydrin with isoamyl alcohol (isoamyl ethers of glycerol and diglycerol), the remainder of the solution being water.

One percent by volume of the said solution is added to an aqueous caustic soda liquor of 26° Bé. Raw thread fabric is wetted through and through by the resultant liquor in 20 seconds. This liquor remains very active and clear for a long time.

By drying the said liquor, the crude sodium salt of the wetting agent is obtained. This is obtained in pure form as colorless crystals by recrystallization from alcohol. Upon addition of an aqueous barium chloride solution to an aqueous solution of the pure sodium salt, the barium salt of isoamyloxypropanolsulfonic acid is precipitated. One gram of this barium salt yields, on addition of sulfuric acid, 0.395 gram of $BaSO_4$ (theory = 0.396 gram).

The pure isoamyloxypropanolsulfonic acid sodium salt is also a good wetting agent in aqueous caustic soda liquor of 20–30° Bé.; in liquors of 26° Bé. and over, it has a tendency to crystallize out.

Instead of epichlorhydrin an equimolecular quantity of bromhydrin may be used.

EXAMPLE 2

The sodium salt of n-amyloxypropanolsulfonic acid is prepared as an aqueous solution of about 45% strength from n-amyl alcohol, after the manner described for the isoamyl derivative in Example 1. One per cent by volume of the thus-obtained solution is added to a mercerizing liquor of 28° Bé., whereby a good wetting capacity is imparted to the latter.

EXAMPLE 3

2-pentyloxychloropropanol is obtained from pentanol-2 by reaction with epichlorhydrin, after the manner described in Example 1 for the reaction between epichlorhydrin and isoamyl alcohol. The crude chlorhydrin ether (550 parts) is then stirred for 12 hours at 90° with 1000 parts of an aqueous sodium sulfite solution of 25% strength. A clear, slightly yellowish solution, which contains about 40% of the sodium salt of 2-pentyloxypropanol sulfonic acid $$CH_3-CH_2-CH_2$$
$$\phantom{CH_3-}\diagdown$$
$$\phantom{CH_3-CH_2}CH-OCH_2-CHOH-CH_2SO_3Na$$
$$\phantom{CH_3-}\diagup$$
$$CH_3$$

is obtained. An addition of 1 to 1.5% by volume of this solution to an aqueous caustic soda or caustic potash solution of 20–30° Bé. very greatly increases the wetting capacity thereof.

The reaction with the sodium sulfite proceeds more rapidly, and a product with even higher wetting capacity is obtained, if it is carried out in the presence of 100 parts of diethylene glycol-mono-n-butyl ether.

EXAMPLE 4

1 mol of a technical amyl alcohol mixture is reacted in the presence of a small quantity of boron fluoride at 80° with 1.4 mols of epichlorhydrin. The resultant crude chlorhydrin ether is then stirred with two mols of sodium hydroxide (in the form of aqueous caustic soda solution of 38% strength) for 5 hours at 30–40°. A chlorine-containing epoxide mixture is obtained, which is reacted first with 0.8 mol of sodium bisulfite (in the form of an aqueous solution of 30% strength) for 4 hours at 85°, after which an additional 0.5 mol of NaOH (aqueous solution of 30% strength) is added to the clear solution which is then boiled for 2 hours under reflux. In this way, the epoxide rings are first split open with addition of $NaHSO_3$, and then the chlorine atoms still present are replaced by OH-groups. A very active wetting agent which is readily soluble in caustic liquors of 20–32° Bé. is thus obtained.

EXAMPLE 5

One mol of epichlorhydrin is reacted with 3 mols of methylamyl alcohol (methylisobutyl carbinol) at 80–85° in the presence of a small quantity of boron fluoride. The excess of methylamyl alcohol is distilled off under reduced pressure, and practically pure methylamyloxychloropropanol $$CH_3 \phantom{CH_2CH_2} CH_3$$
$$\phantom{CH_3}\diagdown \phantom{CH_2CH_2} \diagup$$
$$\phantom{CH_3-}CH-CH_2-CH$$
$$\phantom{CH_3}\diagup \phantom{CH_2CH_2} \diagdown$$
$$CH_3 \phantom{CH_2CH_2} O-CH_2-CHOH-CH_2Cl$$

is obtained. This is stirred for 6 hours at 30–35° with 1.8 mols of sodium hydroxide (aqueous caustic soda solution of 50% strength), and the methylamyloxypropoxide $$CH_3 \phantom{CH_2CH_2} CH_3$$
$$\phantom{CH_3}\diagdown \phantom{CH_2CH_2} \diagup \phantom{CHOCH} O$$
$$\phantom{CH_3-}CH-CH_2-CH \phantom{CH_2} \diagup \diagdown$$
$$\phantom{CH_3}\diagup \phantom{CH_2CH_2} \diagdown$$
$$CH_3 \phantom{CH_2CH_2} O-CH_2-CH-CH_2$$

(which boils at 89–91° under a pressure of 15 mm. Hg) is obtained. The latter is reacted for 5 hours at 90° with one mol of sodium bisulfite (as an aqueous solution of 30% strength), while stirring. A clear solution of the sodium salt of methylamyloxypropanolsulfonic acid $$CH_3 \phantom{CH_2CH_2} CH_3$$
$$\phantom{CH_3}\diagdown \phantom{CH_2CH_2} \diagup$$
$$\phantom{CH_3-}CH-CH_2-CH$$
$$\phantom{CH_3}\diagup \phantom{CH_2CH_2} \diagdown$$
$$CH_3 \phantom{CH_2CH_2} O-CH_2-CHOH-CH_2SO_3Na$$

is obtained. By evaporation, the salt is obtained in the form of white crystals.

To a solution of 27 grams of the said salt in 100 cc. of water, there are added 250 grams of an aqueous solution of $BaCl_2 \cdot 2H_2O$ of 10% strength. The white barium salt of the sulfonic acid is forthwith precipitated. After filtering off the precipitate with suction and after drying, about 30 grams of the barium salt of methylamyloxypropanolsulfonic acid $$(C_6H_{13}OCH_2-CHOH-CH_2SO_3)_2Ba$$

are obtained. This salt is soluble in boiling water to the extent of about 1%, and can be recrystallized from hot water. One gram of the recrystallized and dried barium salt is dissolved in 100 cc. of boiling water, and then 10 cc. of sulfuric acid (10% strength) are added. $BaSO_4$ precipitates which, after filtering off and drying, is weighed; it amounts to 0.375 gram (calculated: 0.378 gram).

The sodium salt is soluble in caustic liquors of 20–32° Bé. and, even when added in small quantities (2 to 4 grams per liter), imparts very good wetting action thereto. In liquors of 26° Bé. and over, the sodium salt tends to crystallize out. By the addition of for example 5 to 20% of an ether alcohol, such as dimethylene glycol-mono-n-butyl ether or glycerol-mono-isoamyl ether, the wetting capacity is further enhanced and crystallization prevented.

*Shrinkage on raw pile yarn 3/2 at 29°*

I. 3 grams of pure sodium salt per liter of NaOH (30° Bé.);

II. 2.75 grams of sodium salt + 0.25 gram of diethylene glycol-mono-n-butyl ether per liter of NaOH (30° Bé.).

| Shrinkage after: | I | II |
|---|---|---|
| 5 sec | 2.8% | 8.0% |
| 10 sec | 6.0% | 15.4% |
| 15 sec | 11.2% | 17.2% |
| 30 sec | 17.0% | 18.4% |
| 45 sec | 18.2% | 18.6% |
| 60 sec | 18.6% | 18.8% |
| 90 sec | 18.8% | 19.0% |
| Solution: | | |
| immediately | clear | clear |
| after 24 hrs | crystallized out | clear |

EXAMPLE 6

1 mol of methylamyl alcohol is reacted with 1.2 mols of epichlorhydrin at 80° in the presence of boron fluoride etherate, and then treated with 2 mols of aqueous sodium hydroxide solution of 30% strength at 30°. There is obtained, as in Example 1, a mixture of methylamylpropenoxide with chlorine-containing condensation products. This mixture is reacted at 85–95° with 0.8 mol of aqueous sodium bisulfite solution (30% strength) for 6 hours, with the addition of 0.2 mol of sodium carbonate. A product is thus obtained which is readily soluble in caustic liquors and which contains about 10% of methylamyl ethers of glycerol, diglycerol and higher condensation products, in addition to about 45% of the sodium salt of methylamyloxypropanolsulfonic acid.

Added to caustic liquors of 20–32° Bé. in amounts of 0.4 to 0.8 percent by volume, the product imparts very good wetting action thereto. The resultant caustic solutions are stable and show no tendency toward crystallization.

A mixture of the obtained solution with 20% (by weight) of hexylene glycol and 5% (by weight) of di-isobutyl carbinol produces a still more enhanced wetting action, and liquors prepared therewith practically do not foam.

EXAMPLE 7

The procedure according to Example 6 is repeated except that the methylamyl alcohol is replaced by 2-ethylbutanol. A solution is obtained which contains about 45% of the sodium salt of 2-ethylbutoxypropanolsulfonic acid

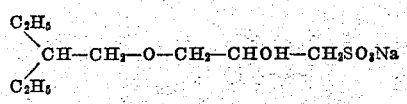

in addition to the corresponding glycerol ethers. 1% by volume of the obtained solution is added to a mercerizing liquor of 28° Bé. Raw undesized thread fabric is wetted through in about 5 seconds by the thus-amplified liquor.

EXAMPLE 8

Heptanol-3 is reacted, after the manner described in Example 6, with epichlorhydrin and caustic soda to produce 3-heptyloxypropenoxide

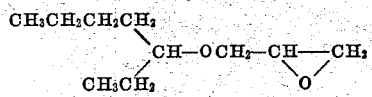

which is then converted with sodium bisulfite into the corresponding 3-heptyloxypropanolsulfonic acid. There is obtained a thickly viscous, clear solution, containing about 45% of the sodium salt of the said acid. If 1% by volume of this solution is added to an aqueous potassium hydroxide solution of 20% strength, the wetting capacity thereof for raw undesized cotton is greatly enhanced.

A mixture of 95 parts of the obtained solution with 5 parts of hexaethylene glycol-mono-dodecyl ether is also a suitable wetting agent for an aqueous caustic soda solution of 5° Bé., such as is used in the manufacture of artificial silk crepe.

Having thus disclosed the invention, what is claimed is:

1. An alkaline solution for treating textile fibers consisting essentially of an aqueous caustic alkali solution of 20 to 40° Bé. containing dissolved therein less than 2% by volume of a compound of the formula

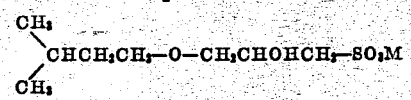

wherein M stands for an alkali metal.

2. An alkaline solution for treating textile fibers consisting essentially of an aqueous caustic alkali solution of 20 to 40° Bé containing dissolved therein less than 2% by volume of a compound of the formula

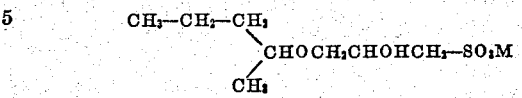

wherein M stands for an alkali metal.

3. An alkaline solution for treating textile fibers consisting essentially of an aqueous caustic alkali solution of 20 to 40° Bé. containing dissolved therein less than 2% by volume of a compound of the formula

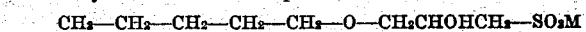

wherein M stands for an alkali metal.

4. An alkaline solution for treating textile fibers consisting essentially of an aqueous caustic alkali solution of 20 to 40° Bé containing dissolved therein less than 2% by volume of a compound of the formula $$R\text{—}O\text{—}CH_2CHOHCH_2\text{—}SO_3M$$

wherein R is a member selected from the group consisting of n-amyl, iso-amyl and secondary amyl groups, and M stands for an alkali metal.

5. A compound of the formula $$R\text{—}O\text{—}CH_2CHOHCH_2\text{—}SO_3M$$

wherein R is a member selected from the group consisting of n-amyl, iso-amyl and secondary amyl groups, and M stands for an alkali metal.

6. A compound of the formula

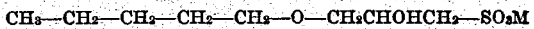

wherein M stands for an alkali metal.

7. A compound of the formula

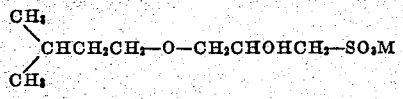

wherein M stands for an alkali metal.

8. A compound of the formula

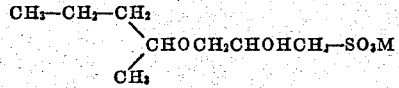

wherein M stands for an alkali metal.

References Cited in the file of this patent

UNITED STATES PATENTS

| | | |
|---|---|---|
| 1,897,741 | Ulrich et al. | Feb. 14, 1933 |
| 1,985,747 | Steindrof et al. | Dec. 25, 1934 |
| 2,010,176 | Brodersen | Aug. 6, 1935 |
| 2,033,125 | Downing et al. | Mar. 10, 1936 |
| 2,094,489 | Hueter et al. | Sept. 28, 1937 |
| 2,427,577 | Smith | Sept. 16, 1947 |